（12) United States Patent
Agrawal et al.

(10) Patent No.: US 12,189,847 B1
(45) Date of Patent: Jan. 7, 2025

(54) DETERMINING RELATIVE POSITIONS OF DEVICES USING GAZE DETECTION

(71) Applicant: Motorola Mobility LLC, Chicago, IL (US)

(72) Inventors: Amit Kumar Agrawal, Bangalore (IN); Jeffrey T Snow, Barrington, IL (US); Olivier D Meirhaeghe, Lincolnshire, IL (US)

(73) Assignee: Motorola Mobility LLC, Chicago, IL (US)

(*) Notice: Subject to any disclaimer, the term of this patent is extended or adjusted under 35 U.S.C. 154(b) by 0 days.

(21) Appl. No.: 18/374,370

(22) Filed: Sep. 28, 2023

(51) Int. Cl.
*G06F 3/01* (2006.01)
*G06F 3/04812* (2022.01)

(52) U.S. Cl.
CPC .......... *G06F 3/013* (2013.01); *G06F 3/04812* (2013.01)

(58) Field of Classification Search
CPC ..................................................... G06F 3/013
See application file for complete search history.

(56) References Cited

U.S. PATENT DOCUMENTS

2020/0050265 A1\* 2/2020 Krishnakumar ........ G06F 3/013

OTHER PUBLICATIONS

"Universal Control: Use a single keyboard and mouse between Mac and iPad", Apple Inc. [retrieved Jul. 19, 2023]. Retrieved from the Internet <https://support.apple.com/en-in/HT212757>., 5 Pages.
LENOVO—Retrieved Jul. 19, 2023, "ThinkCentre Neo 30a (22, Intel) All-in-One", https://www.lenovo.com/in/en/desktops-and-all-in-ones/thinkcentre/thinkcentre-neo-series/ThinkCentre-Neo-30a-22-inch-Intel/p/12B10076HF?cid=in:sem:rcii6z&gclid=Cj0KCQjwyLGjBhDKARIsAFRNgW9GF-pdj_KLqsfx6--ZBBOBhOG0XGlz10zgXPRwLfp0ed7Z5kqwBiUaAg7wEALw_wcB#, 6 Pages.

\* cited by examiner

*Primary Examiner* — Gustavo Polo
(74) *Attorney, Agent, or Firm* — FIG. 1 Patents

(57) ABSTRACT

An electronic device (e.g., a smartphone or tablet) can be connected to another electronic device that is typically a computing device (e.g., a mobile device such as a laptop or a non-mobile device such as a desktop computer or workstation), allowing the electronic devices to be used together. This connection can be a wired connection or a wireless connection. The relative location of one of the electronic devices relative to the other of the electronic devices is automatically determined by analyzing changes in the gaze of the user of the electronic devices. An indication of the position of one of the electronic devices relative to the other is then displayed on one of the electronic devices.

20 Claims, 12 Drawing Sheets

DETERMINING RELATIVE POSITIONS OF DEVICES USING GAZE DETECTION

BACKGROUND

As technology has advanced, our uses for electronic devices have expanded. One such use is small mobile devices, such as smartphones, which have become increasingly powerful despite their small size. These mobile devices provide a great deal of portable processing power but are not without their problems. One such problem is that situations arise in which users desire to use their mobile devices alongside other electronic devices, such as a laptop computer. This can result in the user having to interact with the two devices separately, which can be frustrating for users and lead to user frustration with their devices.

BRIEF DESCRIPTION OF THE DRAWINGS

Embodiments of determining relative positions of devices using gaze detection are described with reference to the following drawings. The same numbers are used throughout the drawings to reference like features and components.

DETAILED DESCRIPTION

Determining relative positions of devices using gaze detection is discussed herein. Generally, an electronic device (e.g., a smartphone or tablet) can be connected to another electronic device that is typically a computing device (e.g., a mobile device such as a laptop or a non-mobile device such as a desktop computer or workstation), allowing the electronic devices to be used together. This connection can be a wired connection or a wireless connection. When the electronic device and the computing device are connected, a single input control device (e.g., a trackpad on a laptop or a mouse) can be used to control user input for both devices.

The relative location of one of the electronic devices relative to the other of the electronic devices is automatically determined by analyzing changes in the gaze of the user of the electronic devices. An indication of the position of one of the electronic devices relative to the other is then displayed on one of the electronic devices. For example, if one electronic device is a smartphone physically placed to the right of another electronic device (e.g., a laptop), the placement of the smartphone to the right of the laptop is automatically detected based on the gaze of the user (e.g., as the user changes from looking approximately straight ahead at the laptop to looking to the right at the smartphone). An indication (e.g., a colored bar) can be displayed along the right side of the display of the laptop to indicate to the user that the smartphone is positioned to the right of the laptop and that the input control device can be used to move the cursor from the display of the laptop to the right and on to the display of the smartphone.

By automatically displaying an indication of the position of a first of the electronic devices on a display of a second of the electronic devices, the techniques discussed herein improve the user interface of the one or more electronic devices by automatically notifying the user which direction he or she can move the single input control device to provide input to the second electronic device. For example, a colored bar can be displayed along a side of a display of a first electronic device that corresponds to the position of the second electronic device relative to the first electronic device.

Figure 1:
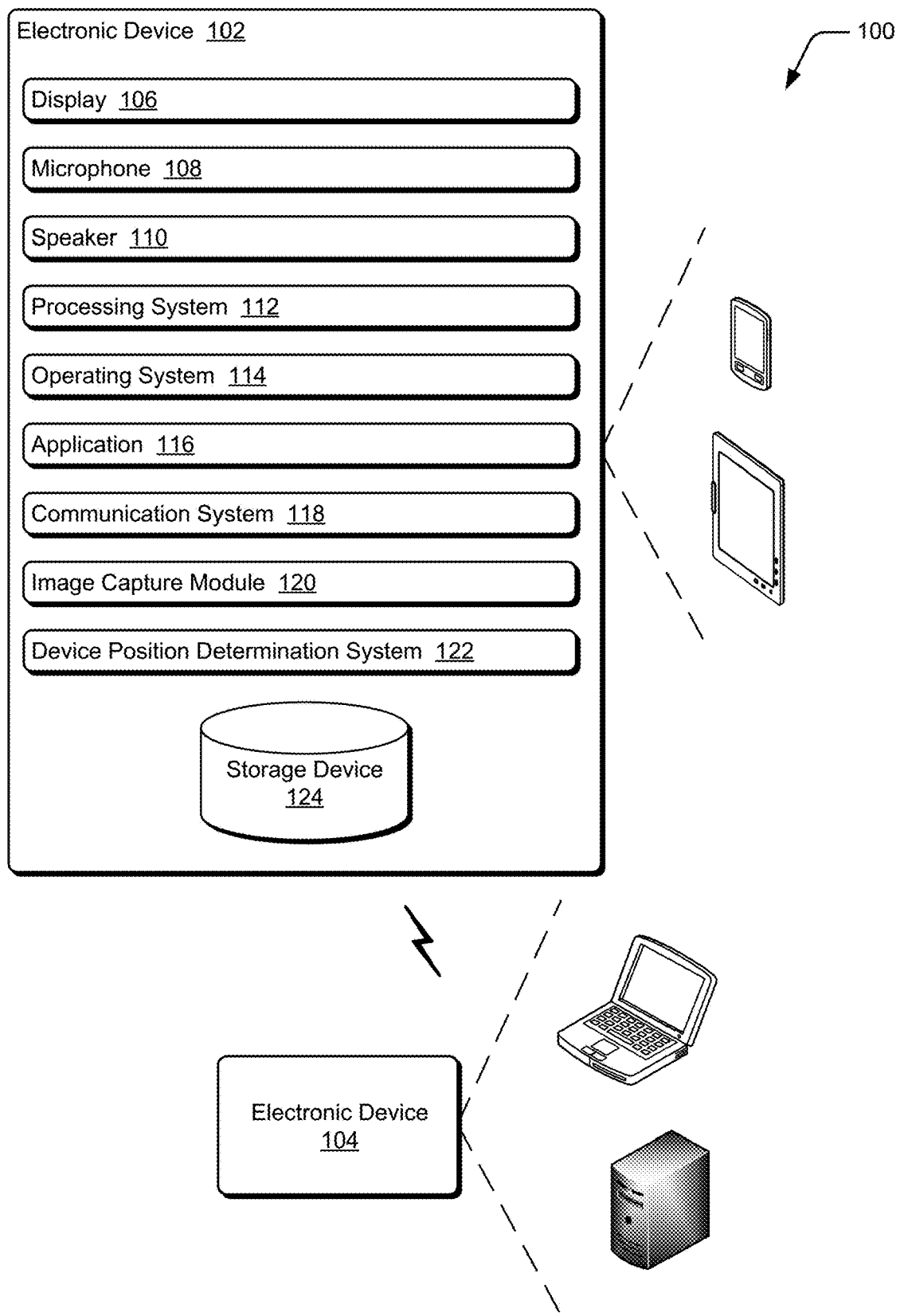
FIG. 1 illustrates an example system implementing the techniques discussed herein.

FIG. 1 illustrates an example system 100 implementing the techniques discussed herein. The system 100 includes an electronic device 102 that can be, or include, many different types of computing or electronic devices. For example, the electronic device 102 can be a computing device, such as a smartphone or other wireless phone, a tablet, and so forth. The system 100 also includes an electronic device 104, which can also be many different types of computing or electronic devices, but is typically (although need not be) a different type of electronic device than the electronic device 102. For example, the electronic device 102 can be a laptop computer, a desktop computer, an automotive computer, a tablet, and so forth.

In one or more implementations, the electronic device 102 is a touch-enabled device. A touch-enabled device refers to a device that receives touch inputs via the display (e.g., a touchscreen). A touch-enabled device may also receive inputs via other input mechanisms, such as trackpad, mouse, physical keyboard, and so forth. In other implementations, the electronic device 102 is a non-touch-enabled device. A non-touch-enabled device refers to a device that does not receive touch inputs via the display (e.g., a touchscreen). Accordingly, a non-touch-enabled device receives inputs via other input mechanisms, such as trackpad, mouse, physical keyboard, and so forth.

The electronic device 104 can be a touch-enabled device or a non-touch-enabled device.

The electronic device 102 includes a display 106. The display 106 can be configured as any suitable type of display, such as an organic light-emitting diode (OLED) display, active matrix OLED display, liquid crystal display (LCD), in-plane shifting LCD, projector, and so forth.

The electronic device 102 also includes a microphone 108 and a speaker 110. The microphone 108 can be configured as any suitable type of microphone incorporating a transducer that converts sound into an electrical signal, such as a dynamic microphone, a condenser microphone, a piezoelectric microphone, and so forth. The speaker 110 can be configured as any suitable type of speaker incorporating a transducer that converts an electrical signal into sound, such as a dynamic loudspeaker using a diaphragm, a piezoelectric speaker, non-diaphragm based speakers, and so forth.

Although illustrated as part of the electronic device 102, it should be noted that one or more of the microphone 108 and the speaker 110 can be implemented separately from the electronic device 102. In such situations, the electronic device 102 can communicate with the microphone 108 or the speaker 110 via any of a variety of wired (e.g., Universal Serial Bus (USB), USB-C, IEEE 1394, or wireless (e.g., Wi-Fi, Bluetooth, infrared (IR)) connections. For example, the microphone 108 may be separate from the electronic device 102 and voice inputs received by the microphone 108 are communicated to the electronic device 102 via an IR or radio frequency wireless connection.

The electronic device 102 also includes a processing system 112 that includes one or more processors, each of which can include one or more cores. The processing system 112 is coupled with, and may implement functionalities of, any other components or modules of the electronic device 102 that are described herein. In one or more embodiments, the processing system 112 includes a single processor having a single core. Alternatively, the processing system 112 includes a single processor having multiple cores or multiple processors (each having one or more cores).

The electronic device 102 also includes an operating system 114. The operating system 114 manages hardware, software, and firmware resources in the electronic device 102. The operating system 114 manages one or more applications 116 running on the electronic device 102 and operates as an interface between applications 116 and hardware components of the electronic device 102.

The electronic device 102 also includes a communication system 118. The communication system 118 manages communication with electronic device 104 and optionally various other devices. The electronic device 102 can be connected to the electronic device 104 and communicate with the electronic device 104 using any of a variety of wired or wireless connections, such as USB, USB-C, WiFi™, WiFi™ IP (Internet Protocol), USB IP, Bluetooth™, DisplayPort, High-Definition Multimedia Interface (HDMI), and so forth. Typically, the electronic device 102 is removably connected to the electronic device 104, allowing the electronic device 104 to be connected to the electronic device 104 and subsequently disconnected from the electronic device 104.

The electronic device 102 also includes an image capture module 120. The image capture module 120 captures images digitally using any of a variety of different technologies, such as a charge-coupled device (CCD) sensor, a complementary metal-oxide-semiconductor (CMOS) sensor, combinations thereof, and so forth. The image capture module 120 can include a single sensor and lens, or alternatively multiple sensors or multiple lenses. For example, the image capture module 120 may have at least one lens and sensor positioned to capture images from the front of the electronic device 102 (e.g., the same surface as the display is positioned on), and at least one additional lens and sensor positioned to capture images from the back of the electronic device 102. The image capture module 120 can capture still images as well as video.

The electronic device 102 also includes a device position determination system 122 that automatically determines, based on changes in a gaze of a user of the electronic device 102 and the electronic device 104, a position of the electronic device 104 relative to the electronic device 102. This position is a physical position, such as the electronic device 104 being to the left of the electronic device 102, to the right of the electronic device 102, above the electronic device 102, below the electronic device 102, and so forth.

The device position determination system 122 can be implemented in a variety of different manners. For example, the device position determination system 122 can be implemented as multiple instructions stored on computer-readable storage media and that can be executed by the processing system 112. Additionally or alternatively, the device position determination system 122 can be implemented at least in part in hardware (e.g., as an application-specific integrated circuit (ASIC), a field-programmable gate array (FPGA), an application-specific standard product (ASSP), a system-on-a-chip (SoC), a complex programmable logic device (CPLD), and so forth).

The electronic device 102 also includes a storage device 124. The storage device 124 can be implemented using any of a variety of storage technologies, such as magnetic disk, optical disc, Flash, or other solid state memory, and so forth. The storage device 124 can store various program instructions and data for any one or more of the operating system 114, application 116, and the device position determination system 122.

In one or more implementations, the electronic device 104 includes components analogous to those discussed above with reference to the electronic device 102, such as a display, a microphone, a speaker, a processing system, an operating system, an application, a communication system, and a storage device. However, the electronic device 104 may not include a device position determination system.

Figure 2:
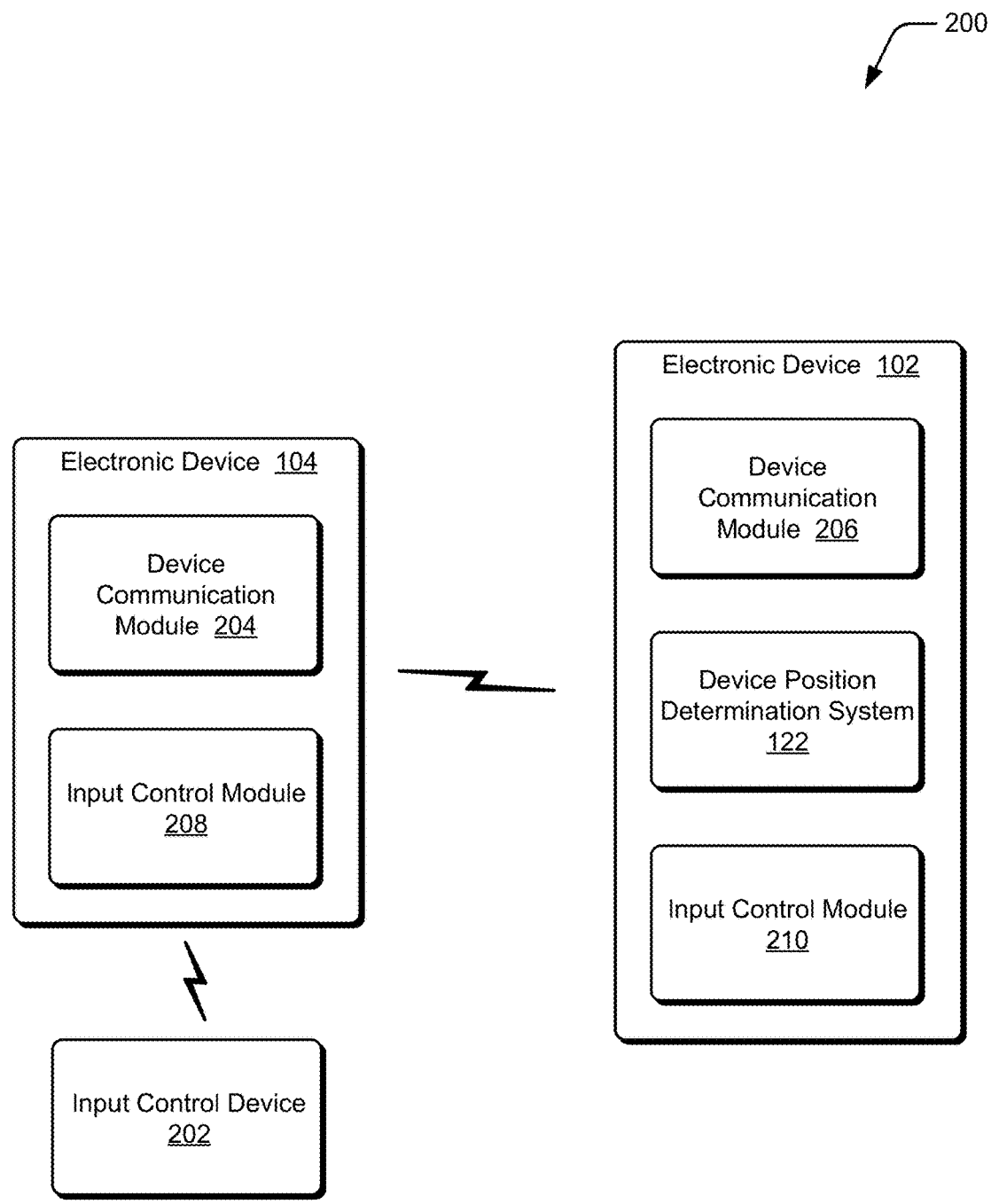
FIG. 2 illustrates an example architecture implementing the techniques discussed herein.

FIG. 2 illustrates an example architecture 200 implementing the techniques discussed herein. The architecture 200 includes the electronic device 102, the electronic device 104, and an input control device 202. The input control device 202, which may also be referred to as a cursor control device or a pointer control device, can be implemented in any of a variety of manners. For example, the input control device 202 may be a mouse, trackpad, keyboard, and so forth. Although illustrated as separate from the electronic device 104, in one or more implementations the input control device 202 is part of the electronic device 104 (e.g., a trackpad of a laptop device).

The electronic device 104 includes a device communication module 204 that implements functionality to detect when the electronic device 104 is connected to the electronic device 102 and to communicate with the electronic device 102 (e.g., send and receive various signals, data, and so forth). Similarly, the electronic device 102 includes a device communication module 206 that implements functionality to detect when the electronic device 102 is connected to the electronic device 104 and to communicate with the electronic device 104 (e.g., send and receive various signals, data, and so forth).

The device communication module 204 can detect that the electronic device 104 is connected to the electronic device 102 (and similarly the device communication module 206 can detect that the electronic device 102 is connected to the electronic device 104) using any of a variety of public or proprietary techniques. For example, the device communication module 204 can transmit a signal that is received by the device communication module 206 indicating that the electronic device 104 is connected to the electronic device 102.

The device position determination system 122 analyzes the gaze of a user of the electronic devices 102 and 104 and determines, based on changes in the gaze, the position of the electronic device 104 relative to the electronic device 102. The gaze of the user refers to where the user is looking, such as direction his or her pupils are facing. The gaze of the user is captured by an image capture module of the electronic device 102, such as image capture module 120 of FIG. 1. The device position determination system 122 uses any of a variety of public or proprietary techniques to determine the gaze of the user and changes in the gaze of the user.

Figure 3:
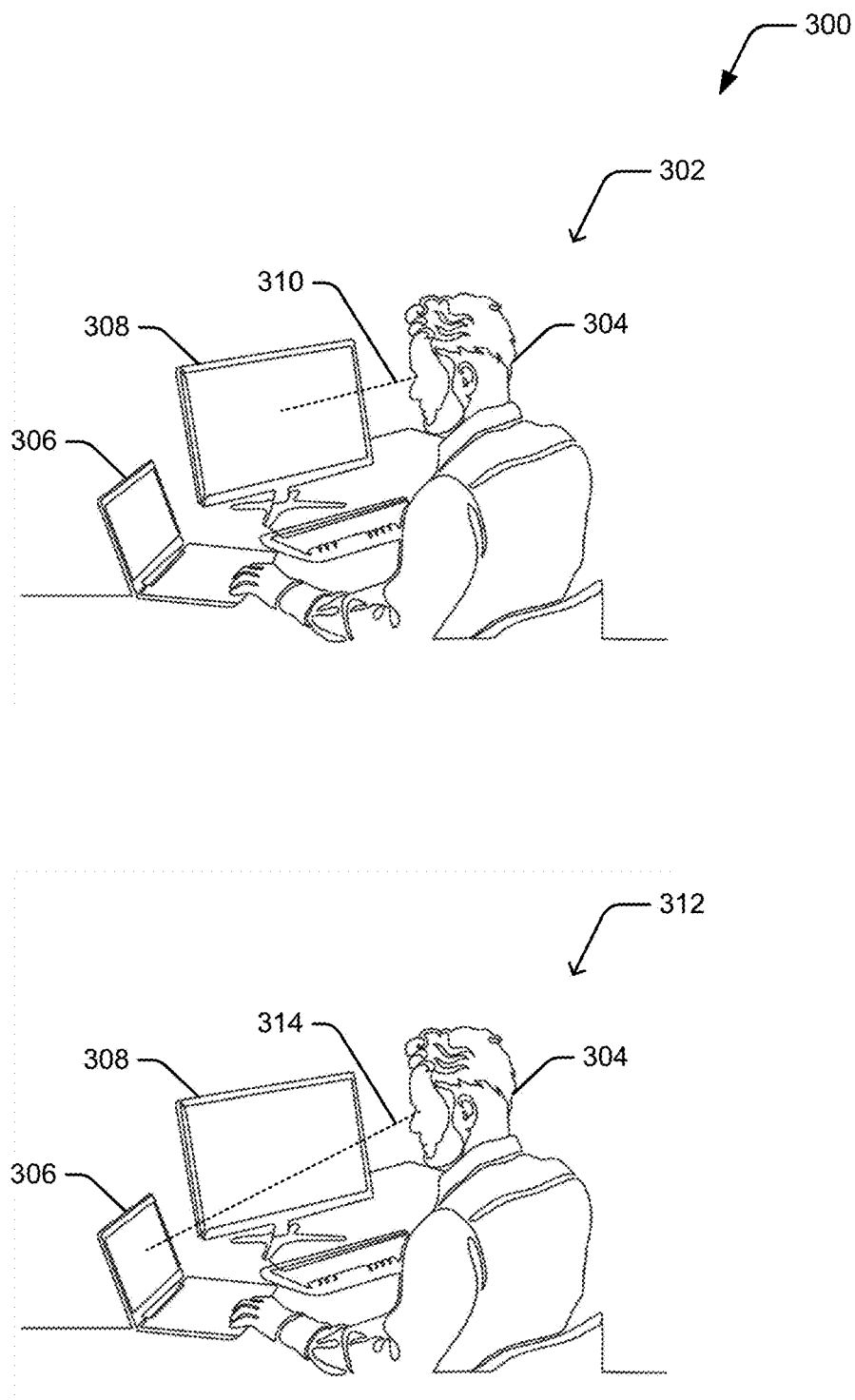
FIG. 3 illustrates an example of a change in gaze using the techniques discussed herein.

FIG. 3 illustrates an example 300 of a change in gaze using the techniques discussed herein. At 302, a user 304 having two electronic devices 306 and 308 is illustrated. A dashed line 310 illustrates the gaze of the user 304 at 302, with the user looking at (gazing at) the electronic device 308.

At 312, the user 304 having the two electronic devices 306 and 308 is illustrated. A dashed line 314 illustrates the gaze of the user 304 at 312, with the user looking at (gazing at) the electronic device 306.

Returning to FIG. 2, the device position determination system 122 determines a change in gaze of the user. For example, based on images of the user (e.g., the user's pupil(s) and/or head) by the image capture module 120, the device position determination system 122 can determine that the gaze of the user changes between looking at the electronic device 102 and looking to the left, between looking at the electronic device 102 and looking to the right, between looking at the electronic device 102 and looking up, between looking at the electronic device 102 and looking down, and so forth. Based on this change in gaze of the user, the device position determination system 122 readily determines the relative position of the electronic device 104 relative to the electronic device 102. For example, if the device position determination system 122 determines that the gaze of the user changes between looking at the electronic device 102 and looking to the left, then the electronic device 104 is positioned to the left of the electronic device 102. By way of another example, if the device position determination system 122 determines that the gaze of the user changes between looking at the electronic device 102 and looking up, then the electronic device 104 is positioned above the electronic device 102.

By way of another example, an image capture module of the electronic device 104 captures images of the user and transmits those images to the device position determination system 122. The image capture module 120 of the electronic device 102 also captures images of the user and compares the images captured by the image capture module 120 to the images received from the electronic device 104. Based on the angles of the pupils and/or head in the images, and the time those images were captured (e.g., as indicated in metadata associated with the images), the device position determination system 122 can readily determine if and when the user gaze changed between looking at the display of the electronic device 104 and looking at the display of the electronic device 102.

In one or more implementations, the device position determination system 122 determines the position of the electronic device 104 relative to the electronic device 102 and provides the relative position to the input control module 210. This allows the input control module 210 to display, on a display of the electronic device 102, an indication of the position of the electronic device 104 relative to the electronic device 102.

Additionally or alternatively, the device position determination system 122 determines the position of the electronic device 104 relative to the electronic device 102 and provides the relative position to the electronic device 104 (e.g., the input control module 208). This allows the input control module 208 to display, on a display of the electronic device 104, an indication of the position of the electronic device 102 relative to the electronic device 104.

Additionally or alternatively, the electronic device 104 includes a device position determination system, analogous to the device position determination system 122, that determines the position of the electronic device 102 relative to the electronic device 104 and provides the relative position to the input control module 208. This allows the input control module 208 to display, on a display of the electronic device 104, an indication of the position of the electronic device 102 relative to the electronic device 104. Additionally or alternatively, the device position determination module provides the relative position to the electronic device 102 (e.g., the input control module 210), allowing the input control module 210 to display, on a display of the electronic device 102, an indication of the position of the electronic device 104 relative to the electronic device 102. In such situations the electronic device 102 need not include the device position determination system 122.

Additionally or alternatively, the device position determination system 122 determines the position of the electronic device 104 relative to the electronic device 102 and provides the relative position to the input control module 210. This allows the input control module 210 to display, on a display of the electronic device 102, an indication of the position of the electronic device 104 relative to the electronic device 102. The electronic device 102 need provide no indication of the relative position to the electronic device 104. The electronic device 104 includes a device position determination system, analogous to the device position determination system 122, that determines the position of the electronic device 102 relative to the electronic device 104 and provides the relative position to the input control module 208. This allows the input control module 208 to display, on a display of the electronic device 104, an indication of the position of the electronic device 102 relative to the electronic device 104 without receiving any indication of the relative position from the electronic device 102.

The position of one electronic device relative to another electronic device is determined in response to any one or more of a variety of different events. One example of such an event is detecting that the electronic device 102 and the electronic device 104 are connected to one another. Another example of such an event is movement of one or both of the electronic device 102 or the electronic device 104 (e.g., based on accelerometer or gyrometer in the electronic device 102 or electronic device 104).

E.g., the position of one electronic device relative to another electronic device may be determined in response to detecting that the two electronic devices are connected to one another. The device position determination system 122 begins monitoring the gaze of the user in response to the electronic devices 102 and 104 being connected and ceases (e.g., stops) monitoring the gaze of the user upon determining the position of the electronic device relative to another electronic device. This determined relative position is maintained and used by one or both of the electronic devices (e.g., to display an indication of one electronic device relative to another) until movement of one or both of the electronic devices is detected. In response to such detected movement, the position of the one electronic device relative to the other electronic device is again determined (e.g., after the movement has stopped, such as stopped for a threshold amount of time (e.g., 2 or 3 seconds)). The device position determination system 122 again ceases (e.g., stops) monitoring the gaze of the user upon determining the position of the electronic device relative to another electronic device.

In one or more implementations, the device position determination system 122 also determines or checks whether a universal control mode has been activated or turned on. When activated or turned on, the universal control mode indicates that inputs received by the electronic device 104 (e.g., from the input control device 202) can be used to control the electronic device 102. The device position determination system 122 performs gaze detection and determines a position of the electronic device 102 relative to the electronic device 104 in response to the universal control mode being activated and the gaze of the user of the electronic devices 102 and 104.

The device position determination system 122 can determine whether the universal control mode is activated or deactivated in any of a variety of different manners. In one or more implementations, a user input is received indicating whether the universal control mode is activated or deactivated and an indication whether the universal control mode is activated or deactivated is saved as a configuration setting. Additionally or alternatively, the operating system 114 or an application 116 may specify whether the universal control mode is activated or deactivated.

In one or more implementations, the device position determination system 122 determines whether universal control mode is activated or deactivated and provides an indication of such to the electronic device 104. An input control module 208 of the electronic device 104 can then determine whether to transmit indications of user inputs to the electronic device 102 as discussed in more detail below. Additionally or alternatively, the electronic device 104 includes a device position determination system (not shown) analogous to the device position determination system 122. In such situations, the device position determination system in the electronic device 104 determines whether universal control mode is activated or deactivated and provides an indication of such to the electronic device 102.

The electronic device 104 receives user input via the input control device 202. This user input can take various forms, such as movement of a cursor or pointer, selection of a button or switch, selection of a pull-down menu, and so forth. The input control module 208 receives this user input and performs whatever action is indicated by the user input, such as moving a pointer or cursor, activating or selecting a button that is clicked on, and so forth, or provides an indication of the user input to an input control module 210 of the electronic device 104. This indication of the user input can include various information, such as a direction of movement of the input control device 202, an amount or length of movement of the input control device 202, user activation of a button (e.g., a mouse click), and so forth. The input control module 208 performs whatever action is indicated by the received indication, such as moving a pointer or cursor, activating or selecting a button that is clicked on, and so forth.

Whether the input control module 208 performs the action indicated by the user input or provides an indication of the user input to the input control module 210 depends on the user input and a current location of a pointer or cursor. The input control module 208 knows the dimensions of a display of the electronic device 104 and keeps track of the current location of the pointer or cursor on the display of the electronic device 104. The input control module 208 also knows the location of the electronic device 102 relative to the electronic device 104 (e.g., whether the electronic device 102 is to the left of the electronic device 104, the electronic device 102 is to the right of the electronic device 104, and so forth). The input control module 208 (and the electronic device 102) knows the location of the electronic device 102 relative to the electronic device 104 based on, for example, a gaze of a user of the electronic devices 102 and 104 as discussed above.

If user input would result in moving the pointer or cursor off the display on the electronic device 104 in the direction of the electronic device 102, the input control module 208 stops displaying the pointer or cursor on the display of the electronic device 104 and also provides the indication of the user input to the input control module 210 so that the input control module 210 can display and move the pointer or cursor appropriately on the display of the electronic device 102, or select the appropriate button on the display of the electronic device 102. Similarly, if the user input then moves the pointer or cursor off the display on electronic device 102 in the direction of the electronic device 104, the input control module 210 stops displaying the cursor or pointer on the display of the electronic device 102, the input control module 208 stops providing the indication of the user input to the input control module 210 and the input control module 208 displays and moves the pointer or cursor appropriately, or selects the appropriate button, on the display of the electronic device 104.

In one or more implementations, the input control module 208 displays an indication of which side (e.g., left, right, top, or bottom) of the electronic device 104 the electronic device 102 is positioned (e.g., where the electronic device 104 is positioned relative to the electronic device 102). The displayed indication can take various forms, such as a rectangular box along the entire edge of the display of the electronic device 104 with a particular fill or color (e.g., a green box), a rectangular box along a portion of the edge of the display of the electronic device 104 with a particular fill or color (e.g., a green box), changing the manner in which the pointer or cursor is displayed (e.g., changing the color of the pointer or cursor), and so forth.

The input control module 208 can display the indication when the user input is close to moving the pointer or cursor off the display of the electronic device 104 and onto the display of the electronic device 102. This closeness can be determined in various manners, such as the pointer or cursor being within a threshold distance (e.g., a threshold number of pixels) of the edge of the display of the electronic device 104. Additionally or alternatively, the input control module 208 displays the indication regardless of how close the user input is to moving the pointer or cursor off the display of the electronic device 104 and onto the display of the electronic device 102.

In one or more implementations, the input control module 210 displays an indication of which side (e.g., left, right, top, or bottom) of the electronic device 102 the electronic device 104 is positioned (e.g., where the electronic device 102 is positioned relative to the electronic device 104). The displayed indication can take various forms, such as a rectangular box along the entire edge of the display of the electronic device 102 with a particular fill or color (e.g., a green box), a rectangular box along a portion of the edge of the display of the electronic device 102 with a particular fill or color (e.g., a green box), changing the manner in which the pointer or cursor is displayed (e.g., changing the color of the pointer or cursor), and so forth. The input control module 210 can display the indication when the user input is close to moving the pointer or cursor off the display of the electronic device 102 and onto the display of the electronic device 104. This closeness can be determined in various manners, such as the pointer or cursor being within a threshold distance (e.g., a threshold number of pixels) of the edge of the display of the electronic device 102. Additionally or alternatively, the input control module 208 displays the indication regardless of how close the user input is to moving the pointer or cursor off the display of the electronic device 104 and onto the display of the electronic device 102.

It should be noted that in some situations the height or width of the display of the electronic device 104 may be different than the height or width of the display of the electronic device 102. In such situations, various techniques can be used when the user input moves the pointer or cursor from one display to the other. For example, if the height of the display of the electronic device 104 is larger than the height of the display of the electronic device 102 and the cursor is at the top of the display of the electronic device 104, then the pointer or cursor may be moved to the top of the display of the electronic device 102. By way of another example, if the height of the display of the electronic device 104 is larger than the height of the display of the electronic device 102 and the cursor is at the top of the display of the electronic device 104, then the pointer or cursor may not be moved to the display of the electronic device 102 until further user input moves the pointer or cursor down to the height of the top of the display of the electronic device 102.

FIGS. 4, 5, 6, 7, 8, 9, and 10 illustrate examples of using the techniques discussed herein. It is to be appreciated that these are only examples and that the electronic devices can be at any location relative to each other (e.g., the electronic device 102 can be diagonal from the electronic device 104 (e.g., upper right, lower left), and so forth). Furthermore, specific examples of electronic devices are illustrated, such as a laptop computer, a smartphone, or a tablet. It is to be appreciated that these are only examples and that the electronic devices can be any of a variety of electronic devices as discussed above.

Figure 4:
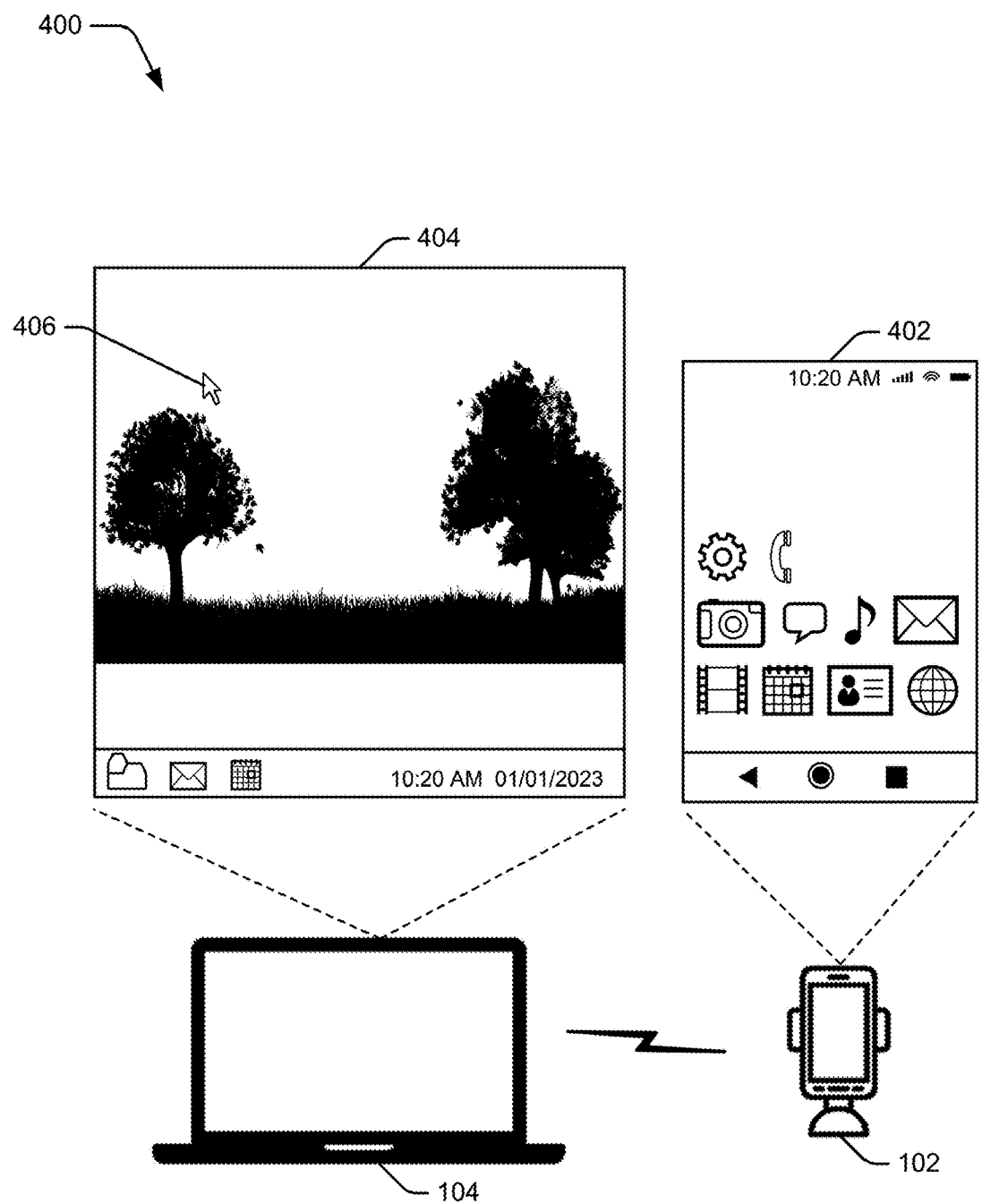
FIGS. 4, 5, 6, 7, 8, 9, and 10 illustrate examples of using the techniques discussed herein.

FIG. 4 illustrates an example 400 of using the techniques discussed herein. The example 400 includes the electronic device 102 (illustrated as a smartphone in a holder or stand) and the electronic device 104 (illustrated as a laptop computer). In the example 400, the electronic device 102 is to the right of the electronic device 104. The electronic device 102 displays on its display a user interface 402 including multiple icons that can be selected to perform various operations or run various applications (e.g., a phone icon selectable to launch a phone application, a music icon selectable to launch a music playback application). The electronic device 104 displays on its display a user interface 404 including a background image (e.g., wallpaper) of trees and grass, and a toolbar including multiple icons that can be selected to perform various operations or run various applications (e.g., an envelope icon selectable to launch an email application, a calendar icon selectable to launch a calendar application). The toolbar also includes additional information such as a current time (e.g., 10:20 AM) and a current date (e.g., 01/01/2023). The user interface 404 also includes a pointer 406 that is controlled by an input control device of the electronic device 104 (e.g., a trackpad that is part of the electronic device 104).

In the example 400, the user input via the input control device of the electronic device 104 has resulted in the pointer 406 being located on the display of the electronic device 104. Accordingly, no pointer is displayed on the display of the electronic device 102.

As illustrated in the example 400, different user interfaces are displayed by the electronic devices 102 and 104. The user interface displayed on the display of the electronic device 102 is different than the display of the electronic device 104 (e.g., the user interface displayed on the display of the electronic device 102 is not mirrored on the display of the electronic device 104), the user interface displayed on the display of the electronic device 102 is not displayed within a window on the display of the electronic device 104, and so forth.

Figure 5:
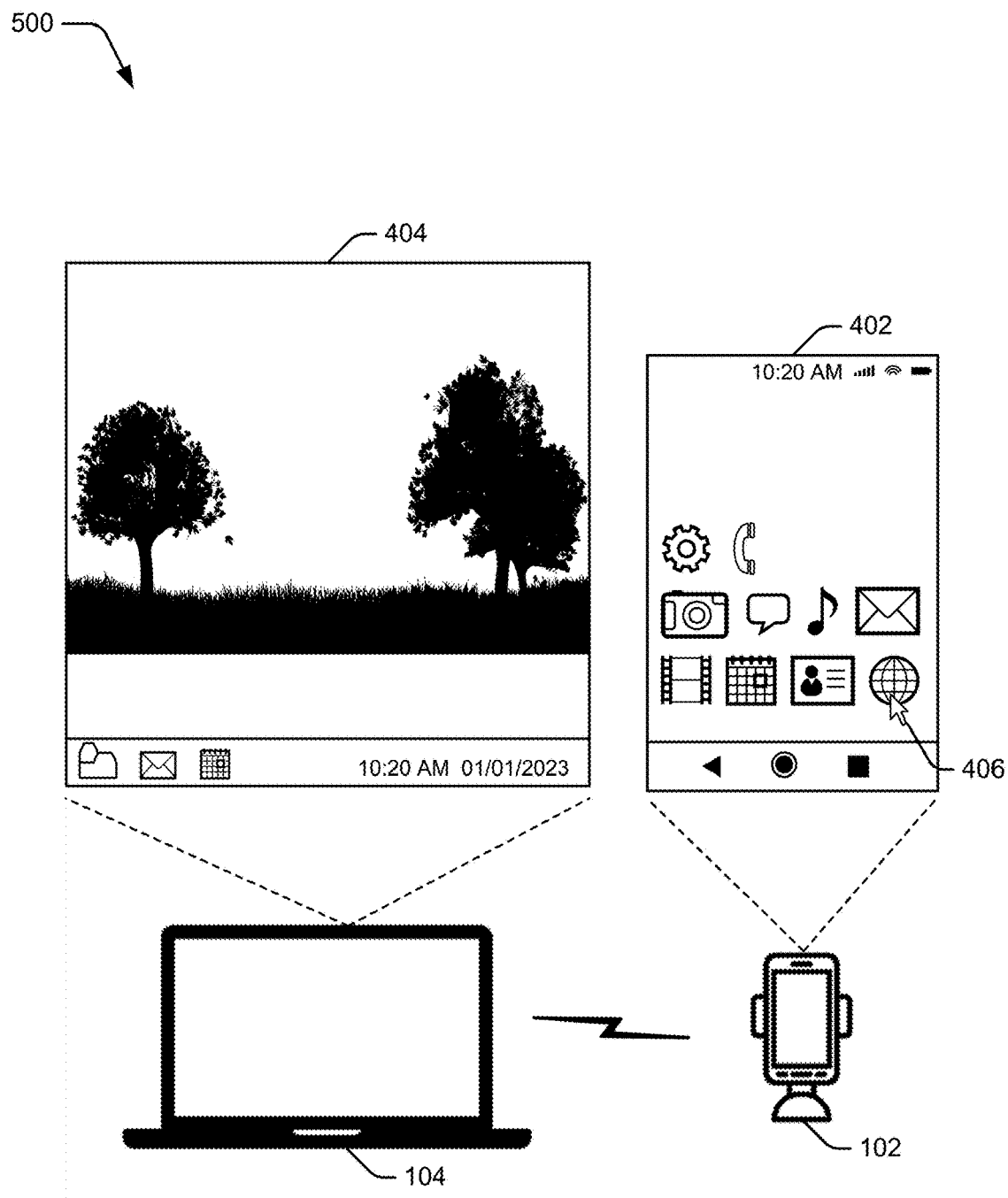

FIG. 5 illustrates an example 500 of using the techniques discussed herein. The example 500 includes the electronic device 102 (illustrated as a smartphone in a holder or stand) displaying the user interface 402 and the electronic device 104 (illustrated as a laptop computer) displaying the user interface 404. In the example 500, the electronic device 102 is to the right of the electronic device 104. The example 500 is analogous to the example 400 of FIG. 4, except that the user input via the input control device of the electronic device 104 has resulted in the pointer 406 being located on the display of the electronic device 102. Accordingly, no pointer is displayed on the display of the electronic device 104. It should be noted that the pointer 406, although displayed on the display of the electronic device 102, is controlled by the input control device of the electronic device 104 (e.g., a trackpad that is part of the electronic device 104).

Figure 6:
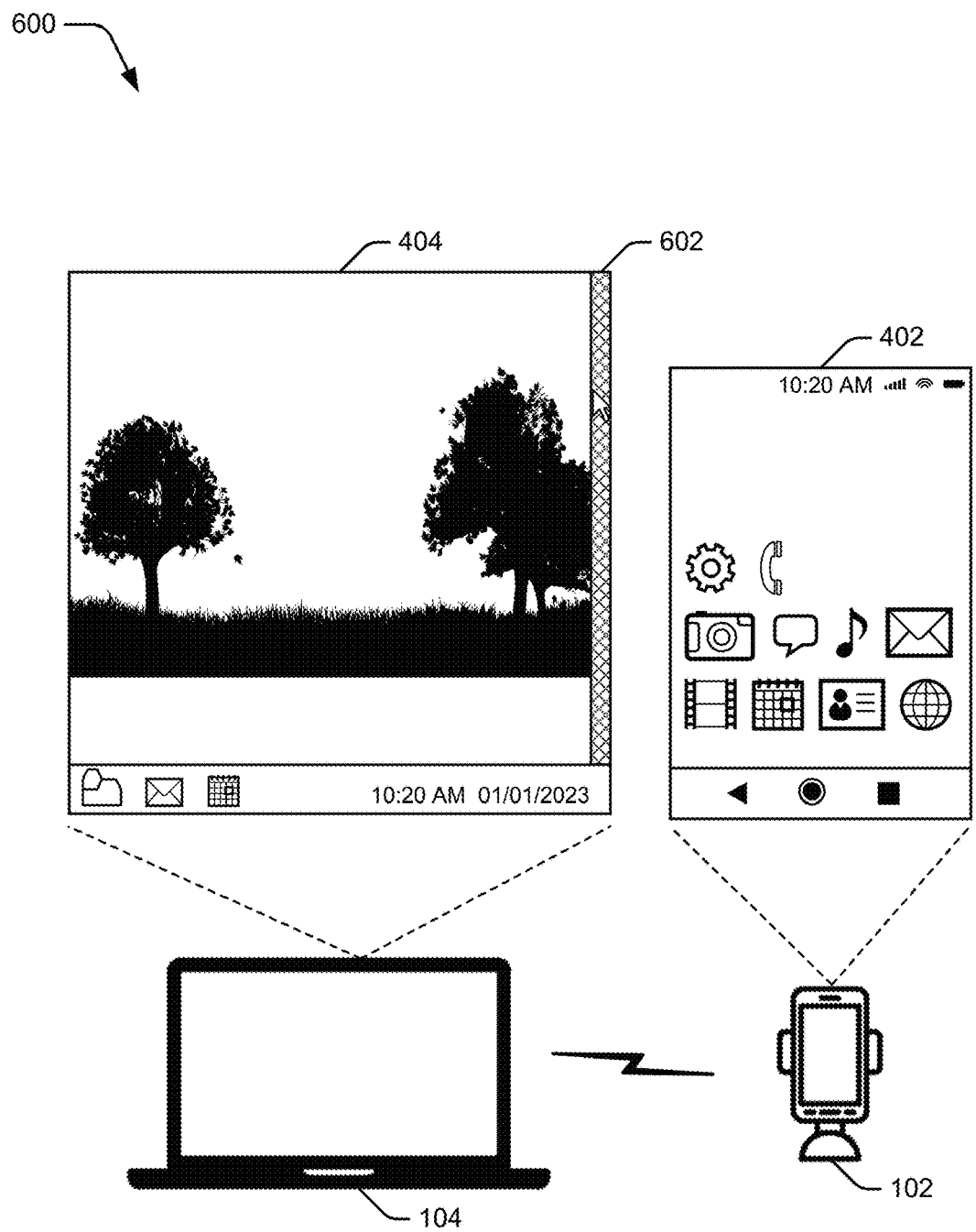

FIG. 6 illustrates an example 600 of using the techniques discussed herein. The example 600 includes the electronic device 102 (illustrated as a smartphone in a holder or stand) displaying the user interface 402 and the electronic device 104 (illustrated as a laptop computer) displaying the user interface 404. In the example 600, the electronic device 102 is to the right of the electronic device 104. The example 600 is analogous to the example 400 of FIG. 4, except that an indication 602 of the position of the electronic device 102 relative to the electronic device 104 is displayed on the display of the electronic device 104. The indication 602 in the example 600 is a bar along the right edge of the display of the electronic device 104, illustrated with cross hatching.

Figure 7:
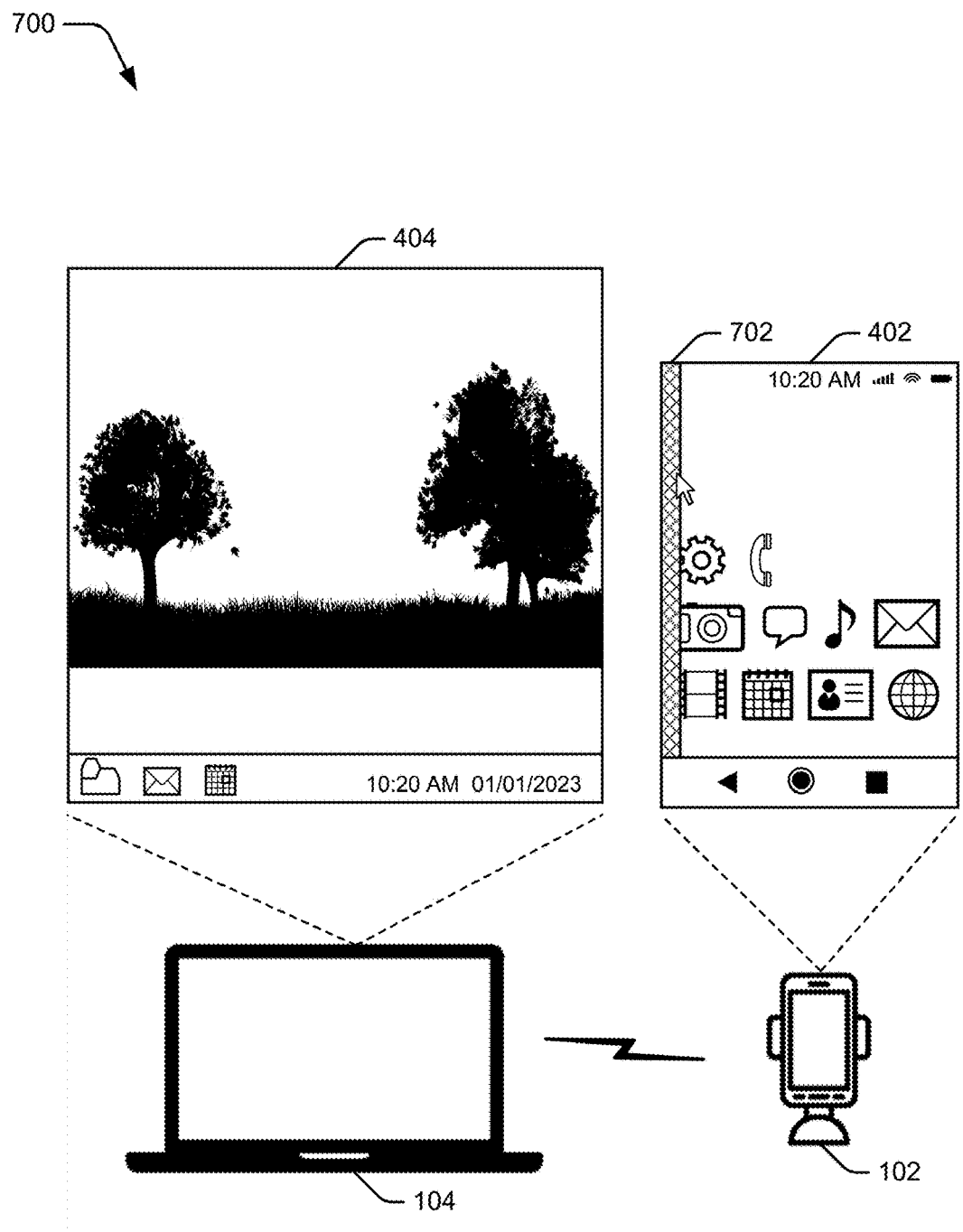

FIG. 7 illustrates an example 700 of using the techniques discussed herein. The example 700 includes the electronic device 102 (illustrated as a smartphone in a holder or stand) displaying the user interface 402 and the electronic device 104 (illustrated as a laptop computer) displaying the user interface 404. In the example 700, the electronic device 102 is to the right of the electronic device 104. The example 700 is analogous to the example 400 of FIG. 4, except that an indication 702 of the position of the electronic device 104 relative to the electronic device 102 is displayed on the display of the electronic device 102. The indication 702 in the example 700 is a bar along the left edge of the display of the electronic device 104, illustrated with cross hatching.

Figure 8:
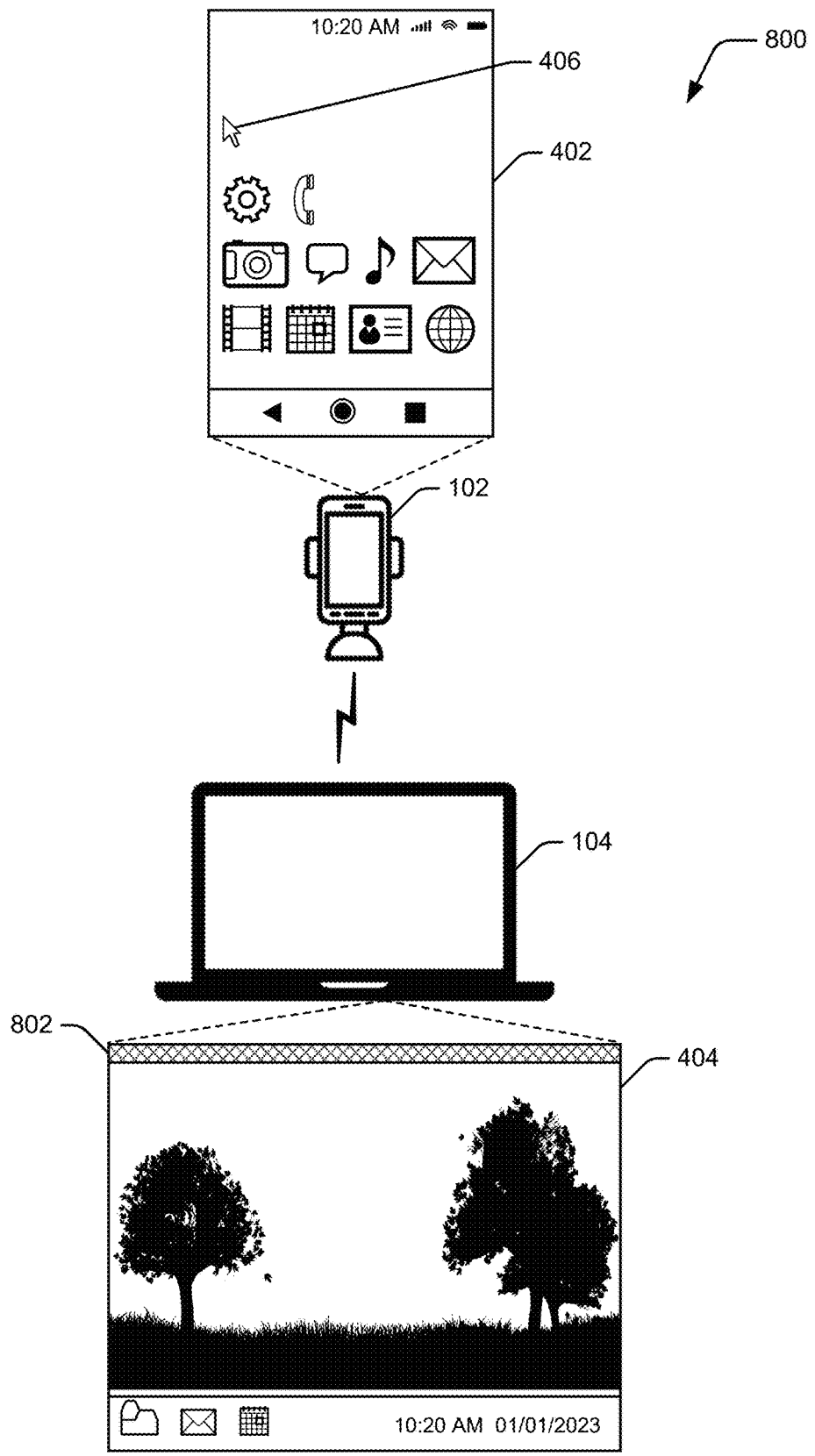

FIG. 8 illustrates an example 800 of using the techniques discussed herein. The example 800 includes the electronic device 102 (illustrated as a smartphone in a holder or stand) displaying the user interface 402 and the electronic device 104 (illustrated as a laptop computer) displaying the user interface 404. In the example 800, the electronic device 102 is above the electronic device 104 (e.g., on a shelf or elevated stand above the electronic device 104). The example 800 is similar to the example 400 of FIG. 4, except for the position of the electronic device 104 relative to the electronic device 102 and that an indication 802 of the position of the electronic device 102 relative to the electronic device 104 is displayed on the display of the electronic device 104. The indication 802 in the example 800 is a bar along the top edge of the display of the electronic device 104, illustrated with cross hatching.

Figure 9:
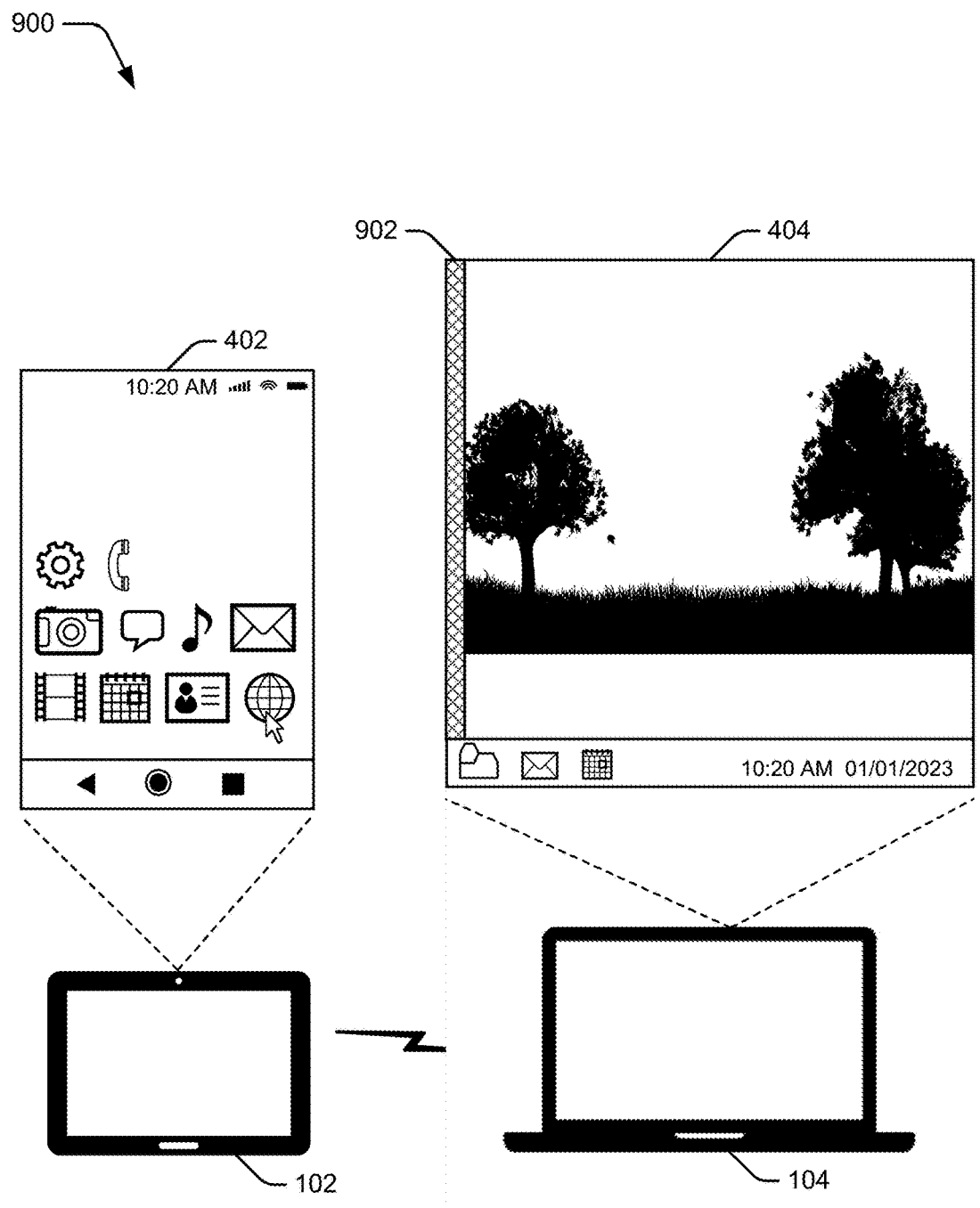

FIG. 9 illustrates an example 900 of using the techniques discussed herein. The example 900 includes the electronic device 102 (illustrated as a tablet) displaying the user interface 402 and the electronic device 104 (illustrated as a laptop computer) displaying the user interface 404. In the example 900, the electronic device 102 is to the left of the electronic device 104 (e.g., on stand or with an arm or kickstand propping up the electronic device 102). The example 900 is similar to the example 400 of FIG. 4, except for the position of the electronic device 104 relative to the electronic device 102 and that an indication 902 of the position of the electronic device 102 relative to the electronic device 104 is displayed on the display of the electronic device 104. The indication 902 in the example 900 is a bar along the left edge of the display of the electronic device 104, illustrated with cross hatching.

Figure 10:
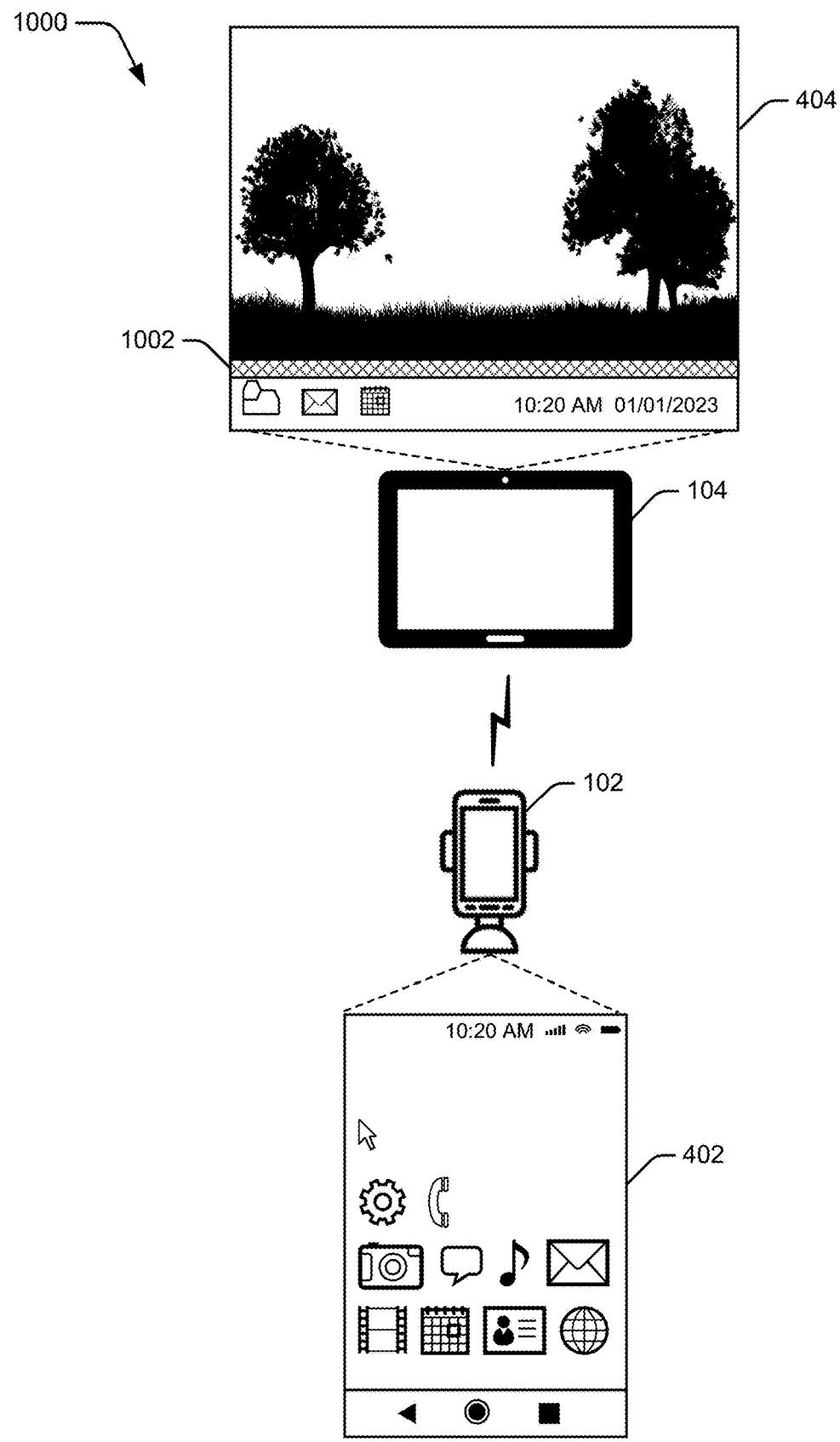

FIG. 10 illustrates an example 1000 of using the techniques discussed herein. The example 1000 includes the electronic device 102 (illustrated as a smartphone in a holder or stand) displaying the user interface 402 and the electronic device 104 (illustrated as a tablet) displaying the user interface 404. In the example 1000, the electronic device 102 is below the electronic device 104 (e.g., which is on a stand or shelf, optionally with an arm or kickstand propping up the electronic device 104). The example 1000 is similar to the example 400 of FIG. 4, except for the position of the electronic device 104 relative to the electronic device 102 and that an indication 1002 of the position of the electronic device 102 relative to the electronic device 104 is displayed on the display of the electronic device 104. The indication 1002 in the example 1000 is a bar along the bottom edge of the display of the electronic device 104, illustrated with cross hatching.

It should be noted that some discussions herein refer to two electronic devices. However, it is to be appreciated that one electronic device may be connected to multiple other devices, such as one to the right and one above. The techniques discussed herein apply to situations where one or more electronic devices are connected to another electronic device. Indications of the positions of multiple electronic devices relative to another electronic device can be displayed using the techniques discussed herein. For example, if a first electronic device is connected to a second electronic device positioned to the right of the first electronic device and a third electronic device positioned above the first electronic device (the positions being determined based on changes in the gaze of the user as discussed above), a first indication indicating that the second electronic device is to the right of the first electronic device can be displayed along the right edge of the display of the first electronic device, and a second indication indicating that the third electronic device is above the first electronic device can be displayed along the top edge of the display of the first electronic device.

Figure 11:
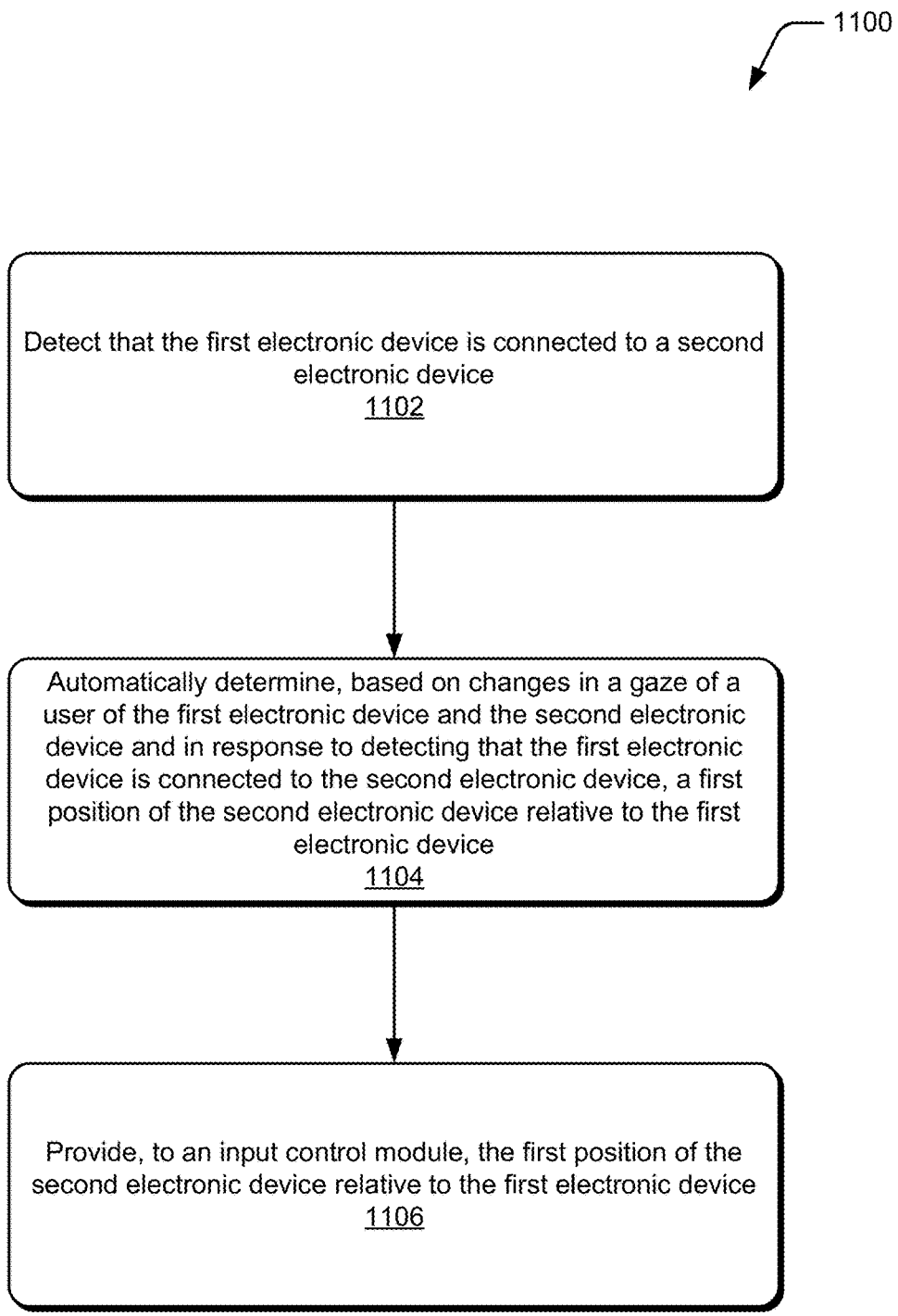
FIG. 11 illustrates an example process for implementing the techniques discussed herein in accordance with one or more embodiments.

FIG. 11 illustrates an example process 1100 for implementing the techniques discussed herein in accordance with one or more embodiments. Process 1100 is carried out at least in part by a device position determination system, such as device position determination system 122 of FIG. 1 or FIG. 2, and can be implemented in software, firmware, hardware, or combinations thereof. Process 1100 is shown as a set of acts and is not limited to the order shown for performing the operations of the various acts.

In process 1100, a first electronic device being connected to a second electronic device is detected (act 1102). As discussed above, this connection can be a wireless connection or a wired connection.

A position of the second electronic device relative to the first electronic device is automatically determined (act 1104). As discussed above, this determination is based on changes in a gaze of a user of the first electronic device and the second electronic device as well as in response to detecting that the first electronic device is connected to the second electronic device.

The position of the second electronic device relative to the first electronic device is provided to an input control module (act 1106). This input control module may be an input control module of the first electronic device, which can cause an indication of the position of the second electronic device relative to the first electronic device to be displayed on a display of the first electronic device. Additionally or alternatively, this input control module may be an input control module of the second electronic device, which can cause an indication of the position of the second electronic device relative to the first electronic device to be displayed on a display of the second electronic device.

Figure 12:
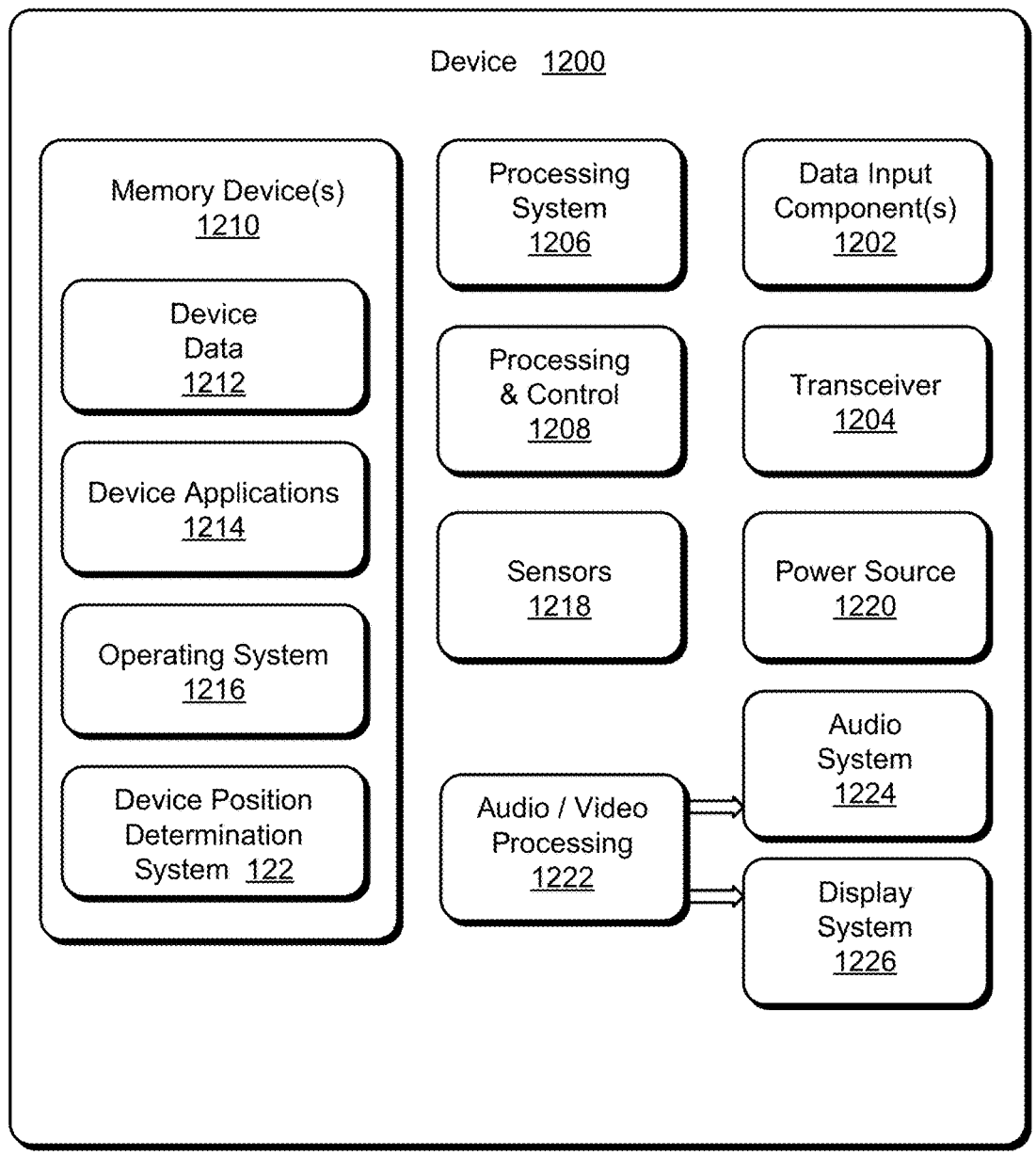
FIG. 12 illustrates various components of an example electronic device in which embodiments of determining relative positions of devices using gaze detection can be implemented.

FIG. 12 illustrates various components of an example electronic device in which embodiments of determining relative positions of devices using gaze detection can be implemented. The electronic device 1200 can be implemented as any of the devices described with reference to the previous FIGS., such as any type of client device, mobile phone, tablet, computing, communication, entertainment, gaming, media playback, or other type of electronic device. In one or more embodiments the electronic device 1200 is an electronic device 102 or electronic device 104 and includes the device position determination system 122, described above.

The electronic device 1200 includes one or more data input components 1202 via which any type of data, media content, or inputs can be received such as user-selectable inputs, messages, music, television content, recorded video content, and any other type of text, audio, video, or image data received from any content or data source. The data input components 1202 may include various data input ports such as universal serial bus ports, coaxial cable ports, and other serial or parallel connectors (including internal connectors) for flash memory, DVDs, compact discs, and the like. These data input ports may be used to couple the electronic device to components, peripherals, or accessories such as keyboards, microphones, or cameras. The data input components 1202 may also include various other input components such as microphones, touch sensors, touchscreens, keyboards, and so forth.

The device 1200 includes communication transceivers 1204 that enable one or both of wired and wireless communication of device data with other devices. The device data can include any type of text, audio, video, image data, or combinations thereof. Example transceivers include wireless personal area network (WPAN) radios compliant with various IEEE 802.15 (Bluetooth™) standards, wireless local area network (WLAN) radios compliant with any of the various IEEE 802.11 (WiFi™) standards, wireless wide area network (WWAN) radios for cellular phone communication, wireless metropolitan area network (WMAN) radios compliant with various IEEE 802.15 (WiMAX™) standards, wired local area network (LAN) Ethernet transceivers for network data communication, and cellular networks (e.g., third generation networks, fourth generation networks such as LTE networks, or fifth generation networks).

The device 1200 includes a processing system 1206 of one or more processors (e.g., any of microprocessors, controllers, and the like) or a processor and memory system implemented as a system-on-chip (SoC) that processes computer-executable instructions. The processing system 1206 may be implemented at least partially in hardware, which can include components of an integrated circuit or on-chip system, an application-specific integrated circuit (ASIC), a field-programmable gate array (FPGA), a complex programmable logic device (CPLD), and other implementations in silicon or other hardware.

Alternately or in addition, the device can be implemented with any one or combination of software, hardware, firmware, or fixed logic circuitry that is implemented in connection with processing and control circuits, which are generally identified at 1208. The device 1200 may further include any type of a system bus or other data and command transfer system that couples the various components within the device. A system bus can include any one or combination of different bus structures and architectures, as well as control and data lines.

The device 1200 also includes computer-readable storage memory devices 1210 that enable data storage, such as data storage devices that can be accessed by an electronic device, and that provide persistent storage of data and executable instructions (e.g., software applications, programs, functions, and the like stored thereon). Examples of the computer-readable storage memory devices 1210 include volatile memory and non-volatile memory, fixed and removable media devices, and any suitable memory device or electronic data storage that maintains data for electronic device access. The computer-readable storage memory can include various implementations of random access memory (RAM), read-only memory (ROM), flash memory, and other types of storage media in various memory device configurations. The device 1200 may also include a mass storage media device.

The computer-readable storage memory device 1210 provides data storage mechanisms to store the device data 1212, other types of information or data, and various device applications 1214 (e.g., software applications). For example, an operating system 1216 can be maintained as software instructions with a memory device and executed by the processing system 1206 to cause the processing system 1206 to perform various operations or actions. The device applications 1214 may also include a device manager, such as any form of a control application, software application, signal-processing and control module, code that is native to a particular device, a hardware abstraction layer for a particular device, and so on.

The device 1200 can also include one or more device sensors 1218, such as any one or more of an ambient light sensor, a proximity sensor, a touch sensor, an infrared (IR) sensor, accelerometer, gyroscope, thermal sensor, audio sensor (e.g., microphone), and the like. The device 1200 can also include one or more power sources 1220, such as when the device 1200 is implemented as a computing device. The power sources 1220 may include a charging or power system, and can be implemented as a flexible strip battery, a rechargeable battery, a charged super-capacitor, or any other type of active or passive power source.

The device 1200 additionally includes an audio or video processing system 1222 that generates one or both of audio data for an audio system 1224 and display data for a display system 1226. In accordance with some embodiments, the audio/video processing system 1222 is configured to receive call audio data from the transceiver 1204 and communicate the call audio data to the audio system 1224 for playback at the device 1200. The audio system or the display system may include any devices that process, display, or otherwise render audio, video, display, or image data. Display data and audio signals can be communicated to an audio component or to a display component, respectively, via an RF (radio frequency) link, S-video link, HDMI (high-definition multimedia interface), composite video link, component video link, DVI (digital video interface), analog audio connection, or other similar communication link. In implementations, the audio system or the display system are integrated components of the example device. Alternatively, the audio system or the display system are external, peripheral components to the example device.

As used herein, including in the claims, "or" as used in a list of items (e.g., a list of items prefaced by a phrase such as "at least one of" or "one or more of" or "one or both of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on".

Although embodiments of techniques for determining relative positions of devices using gaze detection have been described in language specific to features or methods, the subject of the appended claims is not necessarily limited to the specific features or methods described. Rather, the specific features and methods are disclosed as example implementations of techniques for implementing determining relative positions of devices using gaze detection. Further, various different embodiments are described, and it is to be appreciated that each described embodiment can be implemented independently or in connection with one or more other described embodiments. Additional aspects of the techniques, features, and/or methods discussed herein relate to one or more of the following.

In some aspects, the techniques described herein relate to a method, implemented in a first electronic device, the method including: detecting that the first electronic device is connected to a second electronic device; automatically determining, based on changes in a gaze of a user of the first electronic device and the second electronic device and in response to detecting that the first electronic device is connected to the second electronic device, a first position of the second electronic device relative to the first electronic device; and providing, to an input control module, the first position of the second electronic device relative to the first electronic device.

In some aspects, the techniques described herein relate to a method, further including displaying an indication of the first position of the second electronic device relative to the first electronic device.

In some aspects, the techniques described herein relate to a method, further including: checking whether universal control for the first electronic device has been activated; and automatically detecting the first position of the second electronic device relative to the first electronic device only if universal control for the first electronic device has been activated.

In some aspects, the techniques described herein relate to a method, wherein the first electronic device includes a laptop computer and the second electronic device includes a mobile phone.

In some aspects, the techniques described herein relate to a method, wherein the first electronic device includes a laptop computer and the second electronic device includes a tablet.

In some aspects, the techniques described herein relate to a method, wherein the first electronic device includes a tablet and the second electronic device includes a mobile phone.

In some aspects, the techniques described herein relate to a method, wherein a user interface displayed on the first electronic device is different than a user interface displayed on the second electronic device, and the user interface displayed on the first electronic device is not displayed on the second electronic device.

In some aspects, the techniques described herein relate to a method, further including displaying, on the first electronic device in response to a user input to the first electronic device moving a pointer displayed on a display of the first electronic device within a threshold distance of an edge of the display of the first electronic device, an indication of the first position of the second electronic device relative to the first electronic device.

In some aspects, the techniques described herein relate to a method, wherein the indication includes a colored bar along a side of a display of the first electronic device that corresponds to the first position of the second electronic device relative to the first electronic device.

In some aspects, the techniques described herein relate to a method, further including: ceasing monitoring the gaze of the user; detecting a movement of the first electronic device or the second electronic device; monitoring, in response to the movement of the first electronic device or the second electronic device, the gaze of the user; automatically determining, based on changes in the gaze of the user after movement of the first electronic device or the second electronic device, a second position of the second electronic device relative to the first electronic device; and providing, to the input control module, the second position of the second electronic device relative to the first electronic device.

In some aspects, the techniques described herein relate to a first electronic device, including: a processor implemented in hardware; and a computer-readable storage memory having stored thereon multiple instructions that, responsive to execution by the processor, cause the processor to: detect that the first electronic device is connected to a second electronic device; automatically determine, based on changes in a gaze of a user of the first electronic device and the second electronic device and in response to detecting that the first electronic device is connected to the second electronic device, a first position of the second electronic device relative to the first electronic device; and provide, to an input control module, the first position of the second electronic device relative to the first electronic device.

In some aspects, the techniques described herein relate to a first electronic device, wherein the multiple instructions cause the processor to display an indication of the first position of the second electronic device relative to the first electronic device.

In some aspects, the techniques described herein relate to a first electronic device, wherein the indication includes a colored bar along a side of a display of the first electronic device that corresponds to the first position of the second electronic device relative to the first electronic device.

In some aspects, the techniques described herein relate to a first electronic device, wherein the multiple instructions cause the processor to: cease monitoring the gaze of the user; detect a movement of the first electronic device or the second electronic device; monitor, in response to the movement of the first electronic device or the second electronic device, the gaze of the user; automatically determine, based on changes in the gaze of the user after movement of the first electronic device or the second electronic device, a second position of the second electronic device relative to the first electronic device; and provide, to the input control module, the second position of the second electronic device relative to the first electronic device.

In some aspects, the techniques described herein relate to a first electronic device, wherein a user interface displayed on the first electronic device is different than a user interface displayed on the second electronic device, and the user interface displayed on the first electronic device is not displayed on the second electronic device.

In some aspects, the techniques described herein relate to a first electronic device, including: a display; a device position determination system, implemented at least in part in hardware, configured to detect that the first electronic device is connected to a second electronic device; and an input control module, implemented at least in part in hardware, configured to automatically determine, based on changes in a gaze of a user of the first electronic device and the second electronic device and in response to detecting that the first electronic device is connected to the second electronic device, a first position of the second electronic device relative to the first electronic device, and to display, on the display of the first electronic device, an indication of the first position of the second electronic device relative to the first electronic device.

In some aspects, the techniques described herein relate to a first electronic device, wherein the device position determination system is configured to check whether universal control for the first electronic device has been activated, and automatically detect the first position of the second electronic device relative to the first electronic device only if universal control for the first electronic device has been activated.

In some aspects, the techniques described herein relate to a first electronic device, wherein the indication includes a colored bar along a side of the display of the first electronic device that corresponds to the first position of the second electronic device relative to the first electronic device.

In some aspects, the techniques described herein relate to a first electronic device, wherein: the device position determination system is configured to cease monitoring the gaze of the user, detect a movement of the first electronic device or the second electronic device, monitor, in response to the movement of the first electronic device or the second electronic device, the gaze of the user, and the input control module is configured to automatically determine, based on changes in the gaze of the user after movement of the first electronic device or the second electronic device, a second position of the second electronic device relative to the first electronic device, to display, on the display of the first electronic device, an indication of the second position of the second electronic device relative to the first electronic device.

In some aspects, the techniques described herein relate to a first electronic device, wherein a user interface displayed on the first electronic device is different than a user interface displayed on the second electronic device, and the user interface displayed on the first electronic device is not displayed on the second electronic device.

What is claimed is:

1. A method, implemented in a first electronic device, the method comprising:
   detecting that the first electronic device is connected to a second electronic device;
   automatically determining, in response to detecting that the first electronic device is connected to the second electronic device, a first physical position of the second electronic device relative to the first electronic device based on a dimension of the first electronic device compared to a dimension of the second electronic device and based on changes in a gaze of a user of the first electronic device and the second electronic device; and
   providing, to an input control module, the first physical position of the second electronic device relative to the first electronic device.

2. The method of claim 1, further comprising displaying an indication of the first physical position of the second electronic device relative to the first electronic device.

3. The method of claim 1, further comprising:
checking whether universal control for the first electronic device has been activated; and
automatically detecting the first physical position of the second electronic device relative to the first electronic device only if universal control for the first electronic device has been activated.

4. The method of claim 1, wherein the first electronic device comprises a laptop computer and the second electronic device comprises a mobile phone.

5. The method of claim 1, wherein the first electronic device comprises a laptop computer and the second electronic device comprises a tablet.

6. The method of claim 1, wherein the first electronic device comprises a tablet and the second electronic device comprises a mobile phone.

7. The method of claim 1, wherein a user interface displayed on the first electronic device is different than a user interface displayed on the second electronic device, and the user interface displayed on the first electronic device is not displayed on the second electronic device.

8. The method of claim 1, further comprising displaying, on the first electronic device in response to a user input to the first electronic device moving a pointer displayed on a display of the first electronic device within a threshold distance of an edge of the display of the first electronic device, an indication of the first physical position of the second electronic device relative to the first electronic device.

9. The method of claim 2, wherein the indication comprises a colored bar along a side of a display of the first electronic device that corresponds to the first physical position of the second electronic device relative to the first electronic device.

10. The method of claim 1, further comprising:
ceasing monitoring the gaze of the user;
detecting a movement of the first electronic device or the second electronic device;
monitoring, in response to the movement of the first electronic device or the second electronic device, the gaze of the user;
automatically determining, based on changes in the gaze of the user after movement of the first electronic device or the second electronic device, a second physical position of the second electronic device relative to the first electronic device; and
providing, to the input control module, the second physical position of the second electronic device relative to the first electronic device.

11. A first electronic device, comprising:
a processor implemented in hardware; and
a computer-readable storage memory having stored thereon multiple instructions that, responsive to execution by the processor, cause the processor to:
detect that the first electronic device is connected to a second electronic device;
automatically determine, in response to detecting that the first electronic device is connected to the second electronic device, a first physical position of the second electronic device relative to the first electronic device based on a dimension of the first electronic device compared to a dimension of the second electronic device and based on changes in a gaze of a user of the first electronic device and the second electronic device; and
provide, to an input control module, the first physical position of the second electronic device relative to the first electronic device.

12. The first electronic device of claim 11, wherein the multiple instructions cause the processor to display an indication of the first physical position of the second electronic device relative to the first electronic device.

13. The first electronic device of claim 12, wherein the indication comprises a colored bar along a side of a display of the first electronic device that corresponds to the first physical position of the second electronic device relative to the first electronic device.

14. The first electronic device of claim 11, wherein the multiple instructions cause the processor to:
cease monitoring the gaze of the user;
detect a movement of the first electronic device or the second electronic device;
monitor, in response to the movement of the first electronic device or the second electronic device, the gaze of the user;
automatically determine, based on changes in the gaze of the user after movement of the first electronic device or the second electronic device, a second physical position of the second electronic device relative to the first electronic device; and
provide, to the input control module, the second physical position of the second electronic device relative to the first electronic device.

15. The first electronic device of claim 11, wherein a user interface displayed on the first electronic device is different than a user interface displayed on the second electronic device, and the user interface displayed on the first electronic device is not displayed on the second electronic device.

16. A first electronic device, comprising:
a display;
a device physical position determination system, implemented at least in part in hardware, configured to detect that the first electronic device is connected to a second electronic device; and
an input control module, implemented at least in part in hardware, configured to automatically determine, in response to detecting that the first electronic device is connected to the second electronic device, a first physical position of the second electronic device relative to the first electronic device, and to display, on the display of the first electronic device, an indication of the first physical position of the second electronic device relative to the first electronic device based on a dimension of the first electronic device compared to a dimension of the second electronic device and based on changes in a gaze of a user of the first electronic device and the second electronic device.

17. The first electronic device of claim 16, wherein the indication comprises a colored bar along a side of the display of the first electronic device that corresponds to the first physical position of the second electronic device relative to the first electronic device.

18. The first electronic device of claim 16, wherein:
the device physical position determination system is configured to cease monitoring the gaze of the user, detect a movement of the first electronic device or the second electronic device, monitor, in response to the movement of the first electronic device or the second electronic device, the gaze of the user, and the input control module is configured to automatically determine, based on changes in the gaze of the user after movement of the first electronic device or the second electronic device, a second physical position of the second electronic device relative to the first electronic device, to display, on the display of the first electronic device, an indication of the second physical position of the second electronic device relative to the first electronic device.

19. The first electronic device of claim 16, wherein a user interface displayed on the first electronic device is different than a user interface displayed on the second electronic device, and the user interface displayed on the first electronic device is not displayed on the second electronic device.

20. The method of claim 1, wherein the first physical position of the second electronic device relative to the first electronic device indicates that the second electronic device is positioned at a left side of, at a right of, above, or below the first electronic device.

\* \* \* \* \*